(12) United States Patent
Nakajo (10) Patent No.: US 7,522,505 B2
(45) Date of Patent: *Apr. 21, 2009

(54) OPTICAL MEMORY DEVICE

(75) Inventor: Yukihisa Nakajo, Yokohama (JP)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 483 days.

This patent is subject to a terminal disclaimer.

(21) Appl. No.: 11/153,393

(22) Filed: Jun. 16, 2005

(65) Prior Publication Data

US 2005/0281153 A1 Dec. 22, 2005

(30) Foreign Application Priority Data

Jun. 16, 2004 (JP) ............... 2004-178227

(51) Int. Cl.
*G11B 5/09* (2006.01)
(52) U.S. Cl. .................................. 369/59.11
(58) Field of Classification Search ........ None
See application file for complete search history.

(56) References Cited

U.S. PATENT DOCUMENTS

| 6,557,126 | B1 * | 4/2003 | Kelly | 714/708 |
| 7,224,660 | B2 * | 5/2007 | Nakajo | 369/59.11 |
| 2002/0136122 | A1 * | 9/2002 | Nakano | 369/47.53 |

* cited by examiner

*Primary Examiner*—Joseph Feild
*Assistant Examiner*—Joseph Haley
(74) *Attorney, Agent, or Firm*—Volentine & Whitt, PLLC (57) ABSTRACT

An optical disk device sets an optimal write strategy for an optical disk within a short time period. The optical disk device includes a write strategy setting part for measuring a deviation in information recorded in a test area within the optical information recording medium to set a write strategy, a write strategy determining part for recording information in the test area using the write strategy set by the write strategy setting part, again evaluating the deviation in the recorded information, and repeatedly executing a processing performed by the write strategy setting part to determining an optimal write strategy such that the deviation is within a predetermined range, and write strategy determining part for memorizing the determined write strategy.

7 Claims, 9 Drawing Sheets

|      | 3TL   | 4TL   | 5TL  | 6TL  |
|------|-------|-------|------|------|
| 3TP  | -6.1  | 0.2   | 17.2 | 24.8 |
| 4TP  | -24.2 | -7.1  | 11.7 | 18.6 |
| 5TP  | -28.2 | -10.6 | 7.4  | 11.8 |
| 6TP  | -23.2 | -1.9  | 12.9 | 18.5 |

Fig. 4B

|      | 3TL   | 4TL   | 5TL   | 6TL  |
|------|-------|-------|-------|------|
| 3TP  | -11.4 | -25.6 | -4.8  | 41.3 |
| 4TP  | -28.1 | -32.1 | -11.6 | 35.0 |
| 5TP  | 29.7  | -34.7 | -11.8 | 27.6 |
| 6TP  | -7.2  | 11.9  | 27.5  | 33.7 |

Fig. 4C

|      | 3TL  | 4TL   | 5TL   | 6TL |
|------|------|-------|-------|-----|
| 3TP  | -2.4 | -12.9 | -11.0 | 8.3 |
| 4TP  | -2.0 | -12.5 | -11.6 | 8.2 |
| 5TP  | -0.7 | -12.0 | -9.6  | 7.9 |
| 6TP  | 8.0  | 6.9   | 7.3   | 7.6 |

|     | 3T | 4T | 5T | 6T | 7T | 8T | 6T | 7T | 8T |
|-----|----|----|----|----|----|----|----|----|----|
| 3"  | 1  | 3  | 7  | 13 | 21 | 31 | 43 | 57 | 73 |
| 4"  | 2  | 4  | 8  | 14 | 22 | 32 | 44 | 58 | 74 |
| 5"  | 5  | 6  | 9  | 15 | 23 | 33 | 45 | 59 | 75 |
| 6"  | 10 | 11 | 12 | 16 | 24 | 34 | 46 | 60 | 76 |
| 7"  | 17 | 18 | 19 | 20 | 25 | 35 | 47 | 61 | 77 |
| 8"  | 26 | 27 | 28 | 29 | 30 | 36 | 48 | 62 | 78 |
| 9"  | 37 | 38 | 39 | 40 | 41 | 42 | 49 | 63 | 79 |
| 10T | 50 | 51 | 52 | 53 | 54 | 55 | 56 | 64 | 80 |
| 11T | 65 | 66 | 67 | 68 | 69 | 70 | 71 | 72 | 81 |

OPTICAL MEMORY DEVICE

BACKGROUND OF THE INVENTION

1. Field of the Invention

The present invention relates to an optical memory device that can record information in an optical recording medium and reproduce recorded information from the optical recording medium. Examples of the optical recording medium include compact discs (CDs) and digital video discs (DVDs).

A claim of priority is made to Japanese patent application no. 2004-178227, filed Jun. 16, 2004, the contents of which are incorporated herein by reference.

2. Description of the Related Art

A variety of writable optical recording mediums are commercially available which allow users to record large amounts of information. Examples include write once read memory (WORM) type optical disks, such as CD-R discs, and rewritable type optical disks, such as CD-RW discs. More recently, high-capacity digital video discs (e.g., DVD-R, DVD-RW and DVD-RAM) have been introduced as the result of the use of shorter wavelength laser beams, decreased spot diameters, and thin substrates. Generally, data is recorded in the form of non-reflective marks along a spiral track of the optical discs. Herein, the term "mark" refers to the pit, spot or region along the track in which data of a given logic value (e.g., "1") is recorded along the track. For example, the marks may be formed as non-translucent dye regions in the case of CD-R discs, or as amorphous regions in the case of CD-RW discs. The spaces located between the marks along the spiral track are often referred to as "lands". The lands are typically formed as translucent dye regions in the case of CD-R discs, and as polycrystalline regions in the case of CD-RW discs.

In order to avoid extended gaps (which can cause tracking problems) where there are no marks in the data track of a compact disc, data is typically encoded using "Eight to Fourteen Modulation" (EFM). In EFM, 8-bit bytes are converted to 14 bits, with at least some of the 14 bits being logic "1" (marks). However, variations in physical characteristics among optical discs can result in improper recording of the EFM signal. That is, mark formation failures can occur for a variety of reasons, such as variations in the composition of the dye recording layer of the optical disk, and heat accumulation of the recording media coupled with an insufficient cooling rate. In other words, the writer parameters that might be best suited for one optical disc may not be ideal for another optical disc.

As such, in an effort to improve write accuracy, a reference write pattern is use to determine and set optimal or preferred write parameters of an optical disk to be recorded in advance of a recording operation. Herein, the set write parameters associated with an optical disc are referred to as a "write strategy" of the optical disc. It is known that this write strategy is closely related with a number of factors, including recording rate, dye material, phase-change material, dye film thickness, track configuration, and so on.

The write strategy generally defines or sets a number of variable write conditions of the optical disc. For example, the mark-to-land ration may be varied, an additional pulse may be added to the front end of a write pulse, the rise or fall position of the pulse may be altered, a recording pulse may be converted to a multi-pulse format, and so on.

By varying the mark-to-land ratio, it become possible to provide a good shape for the front end and rear end of the mark, which is generated by irradiating a short pulse onto the optical disk at a high recording power, by shortening the length of the pit during a low speed recording.

Adding an additive pulse to the front end of a recording pulse enhances the shape of the front end, which is formed by additively applying a recording power to the front end of the pit that is difficult in deformation by heat due to irradiation of laser.

Changing the rise or fall position of a pulse by a combination of the mark and land can make uniform the length of the mark and land, which are formed by changing the position of the front end of the land according to the length of a rear land because a heat of any marks influences a next mark, the position of any land is changed or heat of the recording mark is transferred to a front according to the length of a front land, a rear position of a mark is changed or heat of a rear mark is transferred to a rear land to influence the rear land according to the length of the recording mark.

The method of converting a recording pulse into a multi-pulse is mainly used for the phase change disk, such as CD-RW, or DVD. When recording information in a phase change disk using a successive pulse, heat generated during the recording operation erases the front end of the recorded information. To solve the above erase problem, a multi-pulse having a cooling period between marks is used.

Also, since there exist in the market too many kinds of optical disks so that the manufacturers cannot grasp completely, it is impossible to prepare a proper write strategy in advance for all optical disks in the market.

Owing to the above problem, a method of selecting one suitable for an optical disk in use from two or more of write strategies mounted on an optical recording device (e.g., Japanese Patent Publication No. 2000-59047), a method of recording information while varying a write strategy into two or more tracks in an optical disk area and selecting a write strategy of which reproduction jitter is minimized (e.g., Japanese Patent Publication No. 2000-182244), or a method of recording information using a specific record pattern and obtaining a combination of mark and land by which a jitter value or a deviation value is minimized (e.g., Japanese Patent Publication No. 2003-30837), is proposed.

However, the method disclosed in Japanese Patent Publication No. 2000-59047 assumes that an optimal write strategy exists for an unknown optical disk which may not exist. Also, the method requires extraordinary size of memory for storing all strategy patterns, which is not realistic.

In the method disclosed in Japanese Patent Publication No. 2000-182244, a finally selected write strategy is only the most favorable write strategy among the set write strategies and is not the optimal write strategy for an optical disk in use. In addition, the above method is problematic in that tracks are used as a record area for a test.

Also, since the method disclosed in Japanese Patent Publication No. 2003-30837 uses a specific write pattern, an influence of mark or land other than the case of changing a particular mark or land is not sufficiently considered. Accordingly, it is very difficult to set an optimal write strategy for an optical disk in use.

SUMMARY OF THE INVENTION

Exemplary embodiments of the present invention provide an optical disk that substantially obviates one or more problems due to limitations and disadvantages of the related art.

Exemplary embodiments of the present invention provide an optical disk that can set an optimal write strategy for unknown optical disk within a short time period.

An embodiment of the present invention provides an optical disk for recording and reproducing information by forming mark and land in an optical information recording medium. The optical disk comprises: write strategy setting part for measuring a deviation in information recorded in a test area within the optical information recording medium to set a write strategy; write strategy determining part for recording information in the test area using the write strategy set by the write strategy setting part, evaluating deviation in the recorded information, and repeatedly executing a processing performed by the write strategy setting part to determine an optimal write strategy such that the deviation is within a predetermined range; and, write strategy storing part for storing the determined write strategy by the write strategy determining part.

In one embodiment, the write strategy determining part comprises: measuring part for measuring lengths of the mark and land recorded in the optical recording medium; measuring value memorizing part for memorizing a result of the measuring part; theory length memorizing part for memorizing theoretical lengths of the mark and land; deviation value computing part for computing deviation values of the mark and land by changing the write strategy on the basis of the lengths of the mark and land memorized in the measuring value memorizing part and the lengths of the mark and land memorized in the theory length memorizing part; contractile rate computing part for computing inherent contractile rates of all marks and lands from the computed deviation value and an existing probability of each of the marks and lands; and write strategy correcting part for computing a correction value for a reference write strategy on the basis of the inherent contractile rate of and the existing probability of all the marks and lands such that the deviation values of all the marks and lands are within the predetermined range, and correcting the write strategy on the basis of the correction value.

In one embodiment, the recorded information is memorized such that a particular land is followed by a particular mark and a particular mark is followed by a particular land.

In one embodiment, the optical disk further comprises write strategy updating part for recording information in a program area of the optical information recording medium using the write strategy memorized in the write strategy memorizing part and at the same time recording a predetermined block, temporarily stopping the recording of the information, reevaluating the deviation measured by the write strategy setting part, repeatedly executing a processing carried out by the write strategy setting part such that the deviation is within a predetermined range, and updating an optimal write strategy.

In one embodiment, a maximal update amount of one time is in advance determined by the write strategy updating part.

In one embodiment, when again executing the setting of the write strategy, the write strategy update part requires β value or HF modulation value and at the same time setting a recording power such that the required β value or HF modulation value becomes a target value determined in advance.

In one embodiment, the optical disk further comprises data table memorizing the write strategy determined by the write strategy determining part in relation to ID information of the optical information recording medium, wherein the write strategy setting part measures the deviation of the recorded information using the write strategy memorized in the data table with respect to the optical information recording medium memorized in the data table.

BRIEF DESCRIPTION OF THE DRAWINGS

The above an other aspects and features of the present invention will become readily understood from the detailed description that follows, with reference to the accompanying drawings, in which.

DETAILED DESCRIPTION OF PREFERRED EMBODIMENTS

The optical memory device of the present invention will now be described by way of preferred, but non-limiting, embodiments of the invention.

Figure 1:
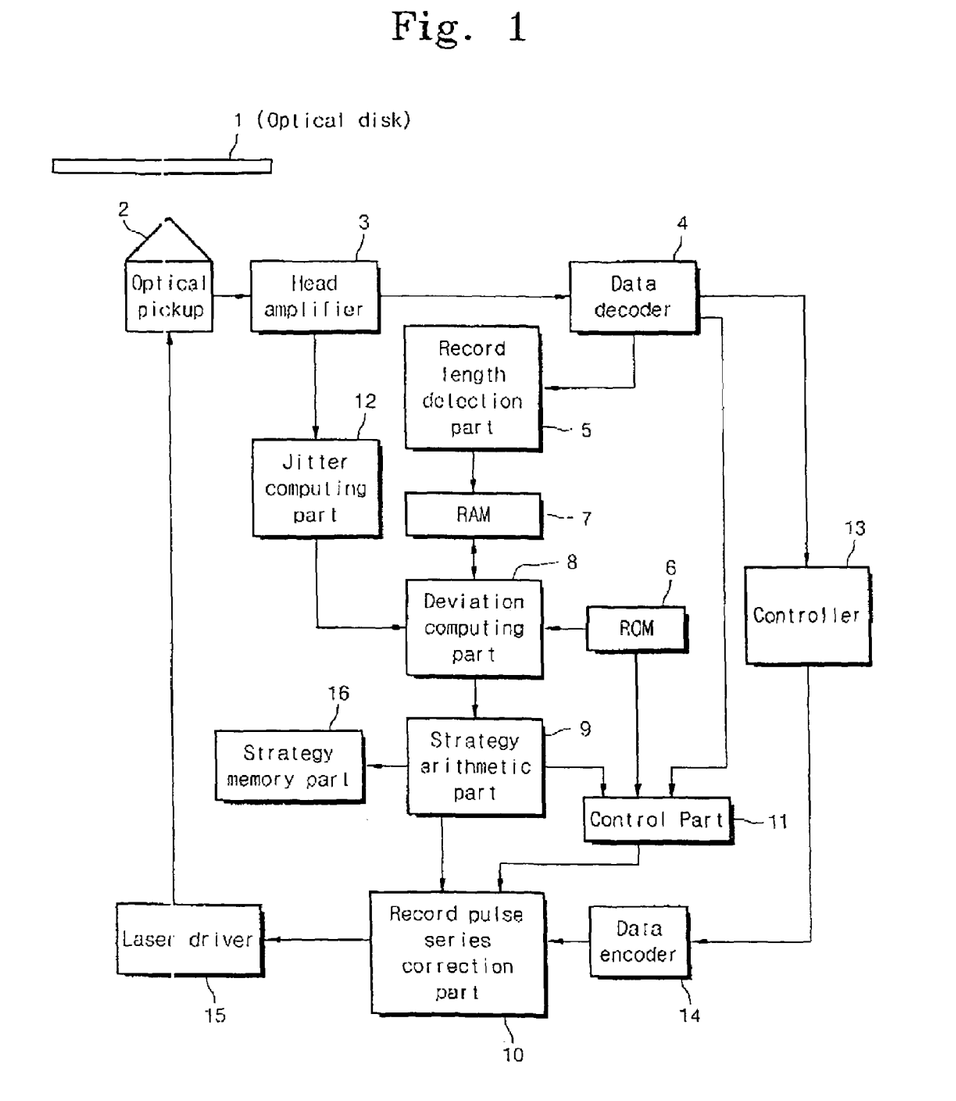
FIG. 1 is a block diagram of an optical disk device according to an embodiment of the present invention.

FIG. 1 is a functional block diagram of an optical disk device according to an embodiment of the present invention. As will be appreciated by those skilled in the art, the various "parts" shown in FIG. 1 may be physically implemented using a software controlled microprocessor, hard-wired logic circuits, or a combination thereof. Also, while the parts are functionally segregated in FIG. 1 for explanation purposes, they may be combined in any physical implementation.

The optical disk device of FIG. 1 includes an optical information recording medium 1, an optical pickup 2, a head amplifier 3, a data decoder 4, a record length detection part 5, a read only memory (ROM) 6, a random access memory (RAM) 7, a deviation computing part 8, a strategy arithmetic part 9, a record pulse series correction part 10, a control part 11, a jitter computing part 12, a controller 13, a data encoder 14, a laser driver 15, and a strategy memory part 16.

In the example of this embodiment, the optical information recording medium 1 is an optical disc that is responsive to a semiconductor laser to record and reproduce information. Examples include CD-Rs, CD-RWs, DVD Rs, DVD RWs, and DVD-RAMs.

The optical pickup 2 is used to record and reproduce information on the optical disc 1. Although not shown, the optical pickup 2 of this example includes a laser beam source such as a laser diode, a collimator lens, an objective lens driven by a focus actuator or a tracking actuator, optical elements such as a polarization beam splitter or a cylindrical lens, a four-division photodetector (PD) having four separate areas A, B, C and D that convert incident light into electrical signals, and a front monitor diode for monitoring a laser output during recording or reproducing operations.

The head amplifier 3 is coupled to the optical pickup 2 so as to generate an RF signal corresponding to the amount (intensity) of the light reflected from the respective areas of the four-division PD. The RF signal is output to the data decoder 4. In addition, the head amplifier 3 and at the same time generates a focus error signal, i.e., a signal corresponding to a focus difference of the laser beams irradiated by the optical pickup 2, using astigmatism, and generates a tracking error signal, which corresponds to a signal detecting a direct deviation of the irradiation laser of the optical pickup 2. Also, in the present embodiment, the head amplifier 3 further has a function measuring a jitter value of the generated RF signal and a function detecting asymmetry from the RF signal.

The data decoder 4 binarizes the RF signal generated by the head amplifier 3 to generate an EFM signal which is output to the record length detection part 5. Further, the data decoder 4 converts the generated EFM signal into a signal of a desired format and outputs the same to the controller 13. Still further, the data decoder 4 computes a compute β value or HF modulation value outputs the same to the control part 11.

The record length detection part 5 receives the EFM signal from the data decoder 4 and measures a pulse width of the EFM signal using a time measuring circuit (not shown).

ROM 6 is a non-rewritable storage unit which stores a control program for controlling all parts of the optical disk device. In addition, the ROM6 stores a particular record pattern used in data recording, theoretical lengths of the mark and land, and the existing probability in the combination of the mark and land.

RAM 7 is a rewritable storage unit which temporarily stores a correction amount in each optical disk, a measurement result of the input record length from the record length detection part 5, a deviation value between the measurement value of the record length and the theoretical lengths of the mark and land, the inherent contractile rate of the mark and land, the measured jitter value, the recording power, the number of samples, a relationship between each write strategy (correction value) and the computed jitter value, and the like.

The deviation computing part 8 compares a deviation value between the measurement value of the record length stored in RAM 7 and the theoretical lengths of the mark and land with already-calculated deviation value, to compute a difference value between the deviation values.

The strategy arithmetic part 9 computes a correction value with respect to a reference write strategy on the basis of the inherent contractile rates of all the marks and lands stored in RAM 7 and the existing probability stored in ROM 6 such that all the deviation values of the marks and lands are within a predetermined range. Also, the computed correction value is stored in the strategy memory 16 along with ID of the optical disk. Further, with respect to an optical disk where the write strategy has been stored in advance, a new deviation is computed using the strategy stored in the strategy memory 16 as a reference strategy.

The record pulse series correction part 10 receives the correction value stored in RAM 7 from the control part 11 and corrects the optical disk using the record pulse series on the basis of the received correction value so as to have an optimal record pulse series.

The control part 11 controls the whole operations of the optical disk device including information recording and reproducing according to the control program. Also, in the present embodiment, the control part 11 reads the write strategy having the best jitter value from RAM 7 and outputs the correction value to the record pulse series correction part 10. Further, the control part 11 determines whether to again set the write strategy from the computed correction value, and determines the optimal recording power from the β value and HF modulation value.

The controller 13 provides the data encoder 14 with a record signal and also reads the record signal from the data decoder 4.

The data encoder 14 converts the record signal provided from the controller 13 into EPM signal or the like and outputs the same to the record pulse series correction part 10.

The laser driver 15 generates a pulse signal for driving the laser diode according to the input record pulse and provides a semiconductor laser (not shown) of the optical pickup 2 with the same.

Finally, the strategy memory part 16 is for storing write strategy data.

Figure 2:
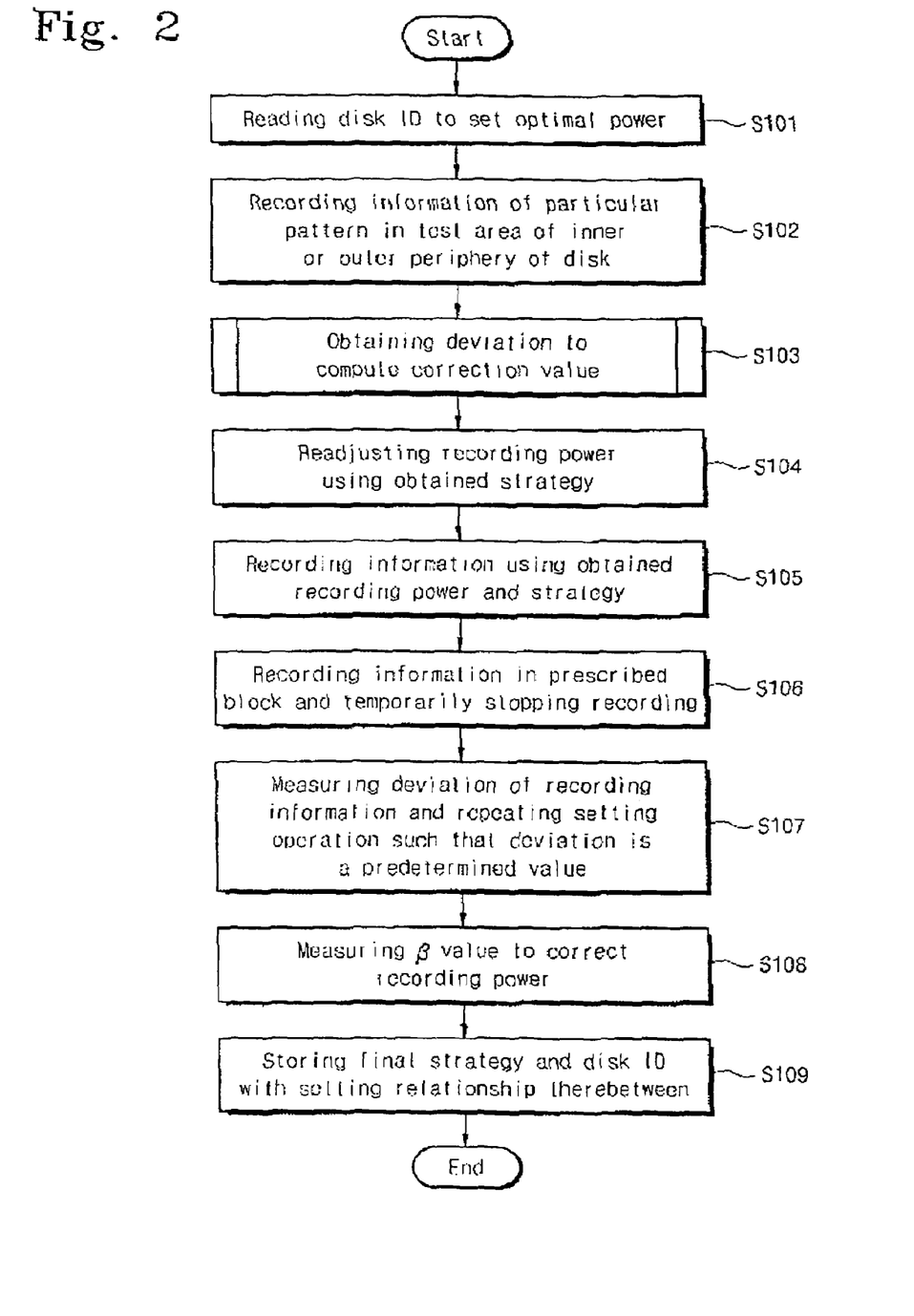
FIG. 2 is a flow chart for explaining a setup sequence of a write strategy according to an embodiment of the present invention.

Next, a procedure for setting an optimal write strategy for a particular optical disk 1 will be described with reference to the flow chart of FIG. 2.

When the optical disk 1 is loaded into the optical disk device, the optical pickup 2 is moved to a given position of the optical disk 1 to read a disk ID of the optical disk 1 and to output the read ID information to the control part 11 via the head amplifier 3 and the data decoder 4. The control part 11 acquires basic information from the input ID information and sets a provisional optimal recording power by execution of an optimum power control (OPC) operation (S101).

After the recording power is set, a signal is recorded in a test area located at an inner periphery or an outer periphery using a preset write pattern (S102). The recorded information is then reproduced and a deviation is obtained, and at the same time a correction value is computed from an inherent contractile rate obtained on the basis of the deviation (S103).

Step S103 is described in more detail below with reference to FIGS. 3 through 7.

As is well known in the art, the marks and lands on a CD do not directly correspond to 1's and 0's of the stored data. Rather, the start and end of a mark (i.e. the mark edges) each correspond to 1's, and all other areas, both within the marks and on the lands, correspond to 0's. CD standards require that there are at least two and at most ten 0's between every 1. As suggested previously, this is achieved using EFM by converting every 8-bit byte into a 14-bit value. The shortest possible mark (or land) thus represents 3 EFM bits (100), and the longest 11 EFM bits (10000000000). If a single bit requires time T to pass under the read head, then marks of these lengths can be referred to as 3T marks and 11T marks.

According to the present embodiment, the mark and land of the EFM signal is set such that a total sum of the lengths of the marks is equal to that of lengths of the lands. Accordingly, for example, if any of the lands is lengthened, the distribution of the marks and lands becomes unbalanced. To correct such an imbalance, the length of the total lands including a changed particular land is shortened. In a real reproduction waveform (RF signal), this phenomenon is exhibited in a state in which a slice level is changed.

Figure 5A:
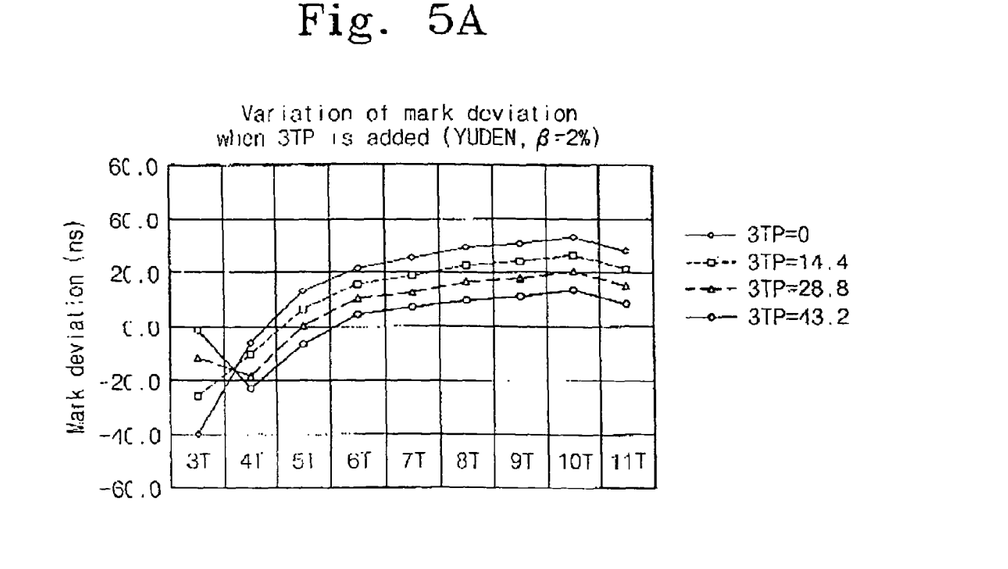
FIGS. 5A and 5B are graphs showing an influence degree of macro in changing the length of 3T mark or 6T mark.

Specifically, among EFM signals, when a 3T mark is extended by ΔT (3T), other marks, e.g., marks of 4T to 11T, show variation in length as shown in FIG. 5A.

Figure 5B:
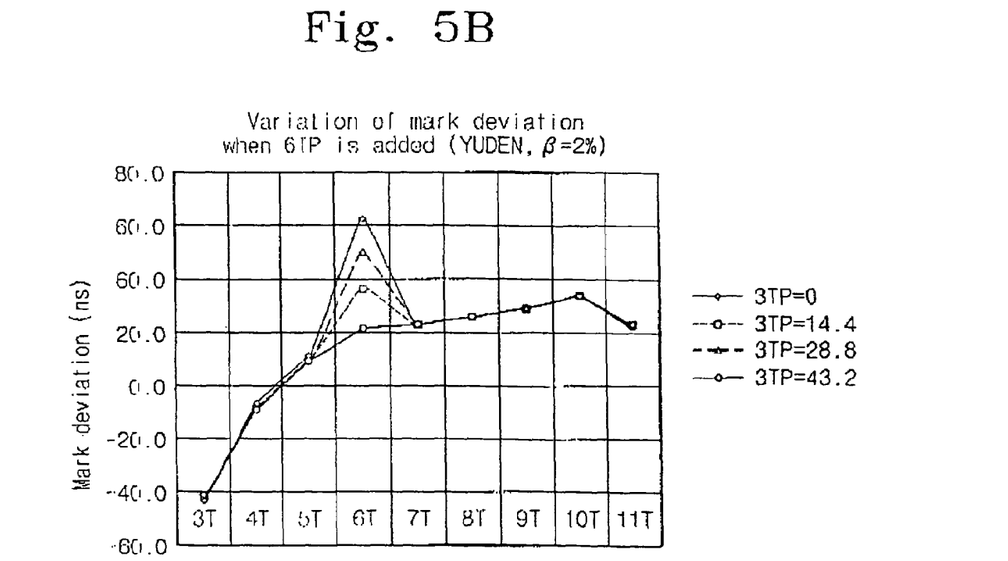

That is, in FIG. 5A, the vertical axis represents a deviation with respect to the theoretical length, the horizontal axis represents kinds of marks, i.e., 3T mark to 11T marks, and the respective lines represent variations in the deviation when a pulse-adding amount of a 3T mark is 0, 14.4 ns, 28.8 ns, and 43.2 ns. FIG. 5B is similar, except that the respective lines represent variations in the deviation when a pulse-adding amount of a 6T mark is 0, 14.4 ns, 28.8 ns, and 43.2 ns.

Assuming that the existing probability of a 3T mark in the EFM signal is 33%, the following relationship is obtained between the existing probability and a variation of the mark from 4T to 11T.

$$\Delta T(3T) \times 0.33 = \Delta T(4-11T) \times (1-0.33)$$

$$\Delta T(4-11T) = \Delta T(3T) \times 0.33/(1-0.33) \quad \text{Equation 1}$$

The variation of from 4T to 11T corresponds to half of the variation of a 3T mark. This result is supported by the real measurement results shown in FIG. 5A. In addition, as shown in FIG. 5B, when a 6T mark having a low existing probability is varied equally, it is known that such a variation influences very little lengths of other mark or land.

Accordingly, by using the existing probability due to the combination of each mark and land, when length of a particular mark or land is varied, it is possible to catch any influence of the length of mark or land other than the particular mark or land.

Figure 3:
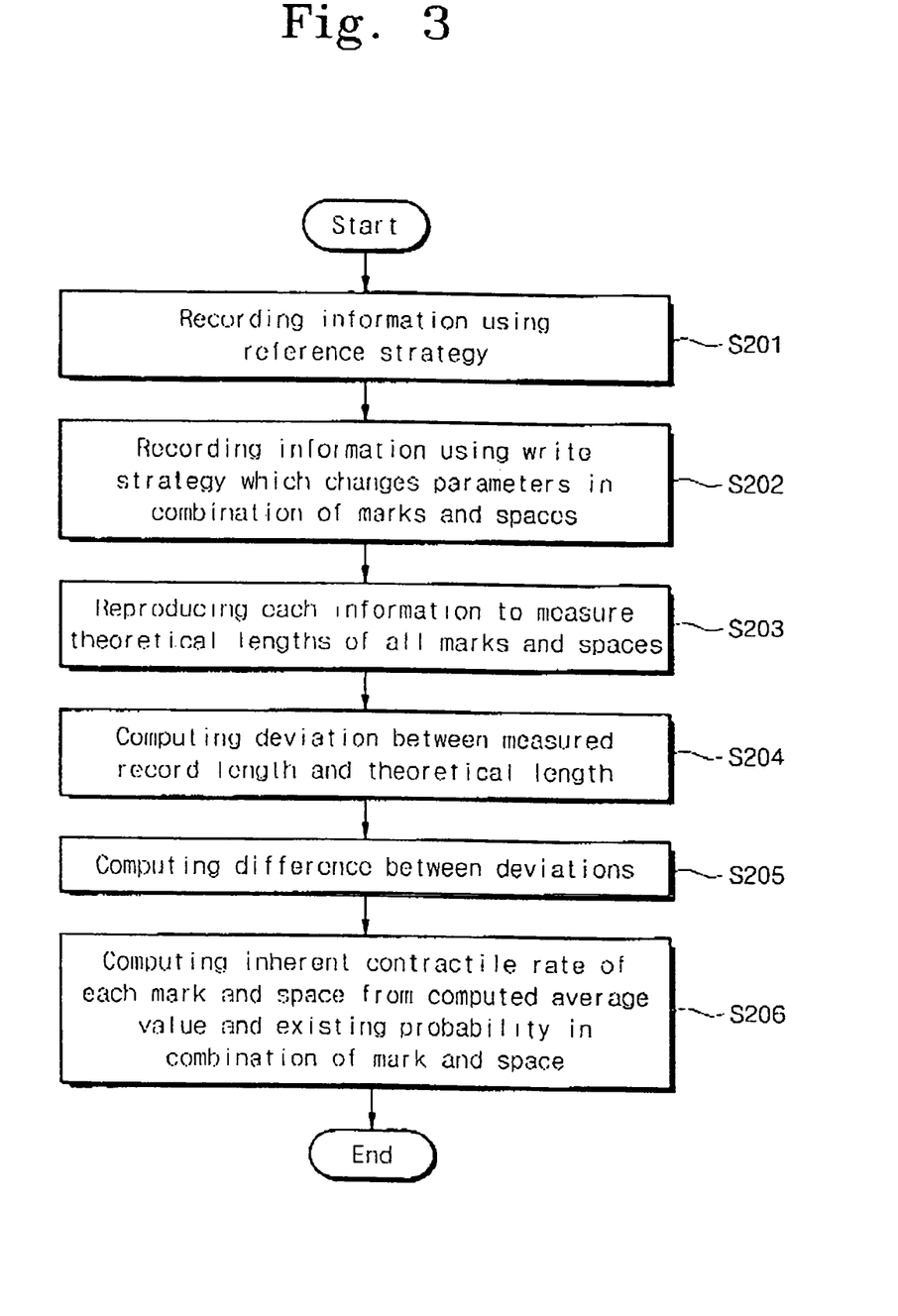
FIG. 3 is a flow chart for explaining computation of a correction value according to an embodiment of the present invention.

Referring to FIG. 3, the control part 11 sets the reference write strategy stored in ROM 6 into the write pulse series correction part 10, and performs the record operation using the particular pattern (S201).

Next, another record operation is performed using a write strategy extended by an integer times of a minimum resolution that can set 3T land to 5T land and 3T mark to 5T mark, which are higher in influencing degree and existing probability than other mark and land (S202). Also, upon considering a subsequent processing, it is good that the contractile rate is the minimum resolution, but since the minimum resolution is a very small value, it is preferable that the contractile rate be an integer times the minimum resolution so as to decrease the influence of an error. Because LSI setting the write strategy is operated on the basis of a given clock, it is impossible to alter successively in analog the write strategy. Accordingly, discrete alteration is performed under the condition that the minimum change is one clock. Herein, minimum change is called minimum resolution.

When the respective recording operations are completed, the respective recording signals are reproduced. At this time, the record length detection part 5 measures the record lengths in combinations of all the marks and lands and stores the measured results in each write strategy in RAM 7 (S203).

The deviation computing part 8 computes first deviations (see FIG. 4A) between the record length when the recording is performed using the reference write strategy stored in RAM 7, and the theoretical length in the combinations of all the marks and lands, and second deviations (see FIG. 4B) between the record length when the recording is performed using the write strategy extended by the integer times of the minimum resolution, and the theoretical length in the combinations of all the marks and lands stored in ROM 6 (S204), and also computes deviations (see FIG. 4C) between the first deviations and the second deviations (S205). Also, when the contractile rate of a 3T mark to a 5T mark before a 3T land to 5T land with respect to the reference write strategy is an integer times the minimum resolution, the obtained deviation is divided by the integer to obtain a deviation with respect to the minimum resolution.

Figure 4A:
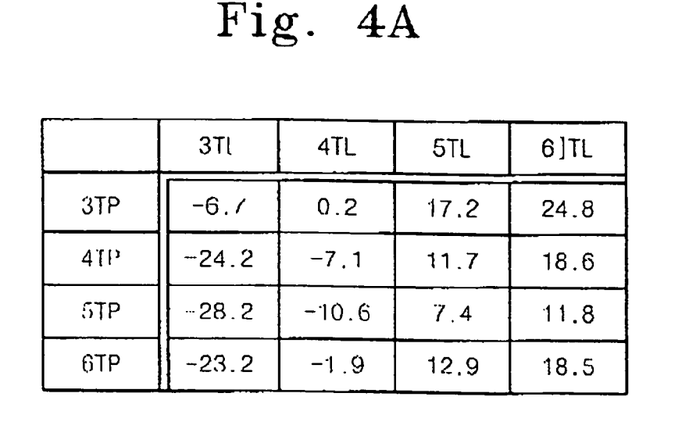
FIGS. 4A to 4C are tables showing examples of deviation values which are obtained according to an embodiment of the present invention.
Figure 4B:
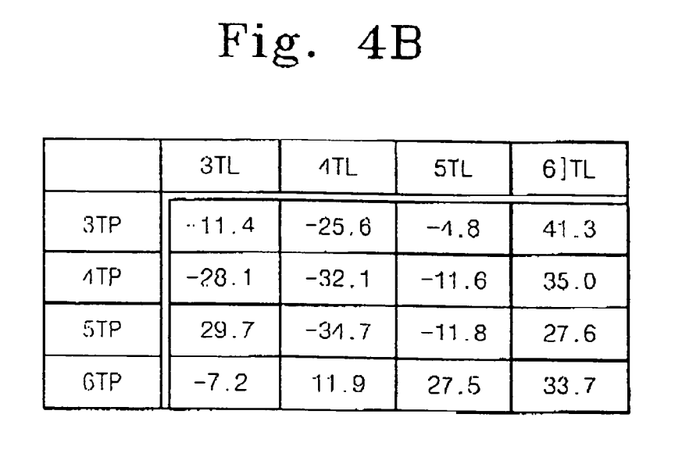
Figure 4C:
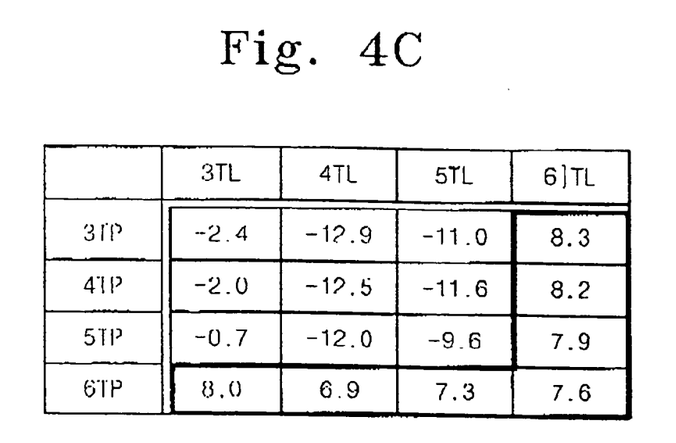

Herein, so as to compute the inherent contractile rate of the mark and land from the computed deviation shown in FIG. 4C, the existing probability by the combination of the mark and land described above is used. For example, the inherent contractile rate of the combination of the 3T mark and 3T land in the horizontal axis of 3TP in FIG. 4C becomes one in which an influence by variation of another mark and land is removed from the deviation in the combination of the 3T mark and 3T land, when the inherent contractile rates in combinations of 3T mark and 3T, 4T and 5T land are given $\Delta T(3, 3)$, $\Delta T(4, 3)$, $\Delta T(5, 3)$ . . . , the existing probabilities of the respective combinations are R(3, 3), R(4, 3), R(5, 3) and the deviation between 3T mark and 3T land is given A, these parameters have relationships expressed by the following equation 2:

$$\Delta T(3,3) - \Delta T(4,3) \times R(4,3)/(1-R(4,3))$$

$$-\Delta T(5,3) \times R(5,3)/(1-R(5,3)) - \ldots = A \quad \text{Equation 2}$$

Meanwhile, referring to region of FIG. 4C enclosed by the bold lines, in the combination including a 6T mark and a 6T land, even though a 6T mark or a 6T land is not varied, there exists a deviation in the approximate value in each combination. This deviation indicates an intensive influence by varying the lengths of 3T mark to 5T mark before 3T land to 5T land.

Accordingly, for example, when a deviation of 3T mark and 6T land is given 'Z', the deviation 'Z' is expressed by the equation 3 shown below. By substituting the equation 3 in the equation 2, equation 4 is obtained. By specifically describing the equation 4 according to values of FIG. 4C, equation 5 is obtained. Since the existing probability in the combination of the mark and land is evident, by using the above equations, the inherent contractile rate in the combination of each of the marks and lands can be obtained (S205).

$$Z = \Delta T(3, 3) \times R(3, 3)/(1 - R(3, 3)) + \\ \Delta T(4, 3) \times R(4, 3)/(1 - R(4, 3)) + \\ \Delta T(5, 3) \times R(5, 3)/(1 - R(5, 3)) + \ldots \quad \text{Equation 3}$$

$$\Delta T(3, 3) = (Z + A)(1 - R(3, 3)) \quad \text{Equation 4}$$

$$\Delta T(3, 3) = (-2.4 - 7.7) \times (1 - R(3, 3)) \quad \text{Equation 5}$$
$$\Delta T(3, 4) = (-2.0 - 7.7) \times (1 - R(3, 4))$$
$$\Delta T(3, 5) = (-0.7 - 7.7) \times (1 - R(3, 5))$$
$$\Delta T(5, 5) = (-9.6 - 7.7) \times (1 - R(5, 5))$$

Figure 6:
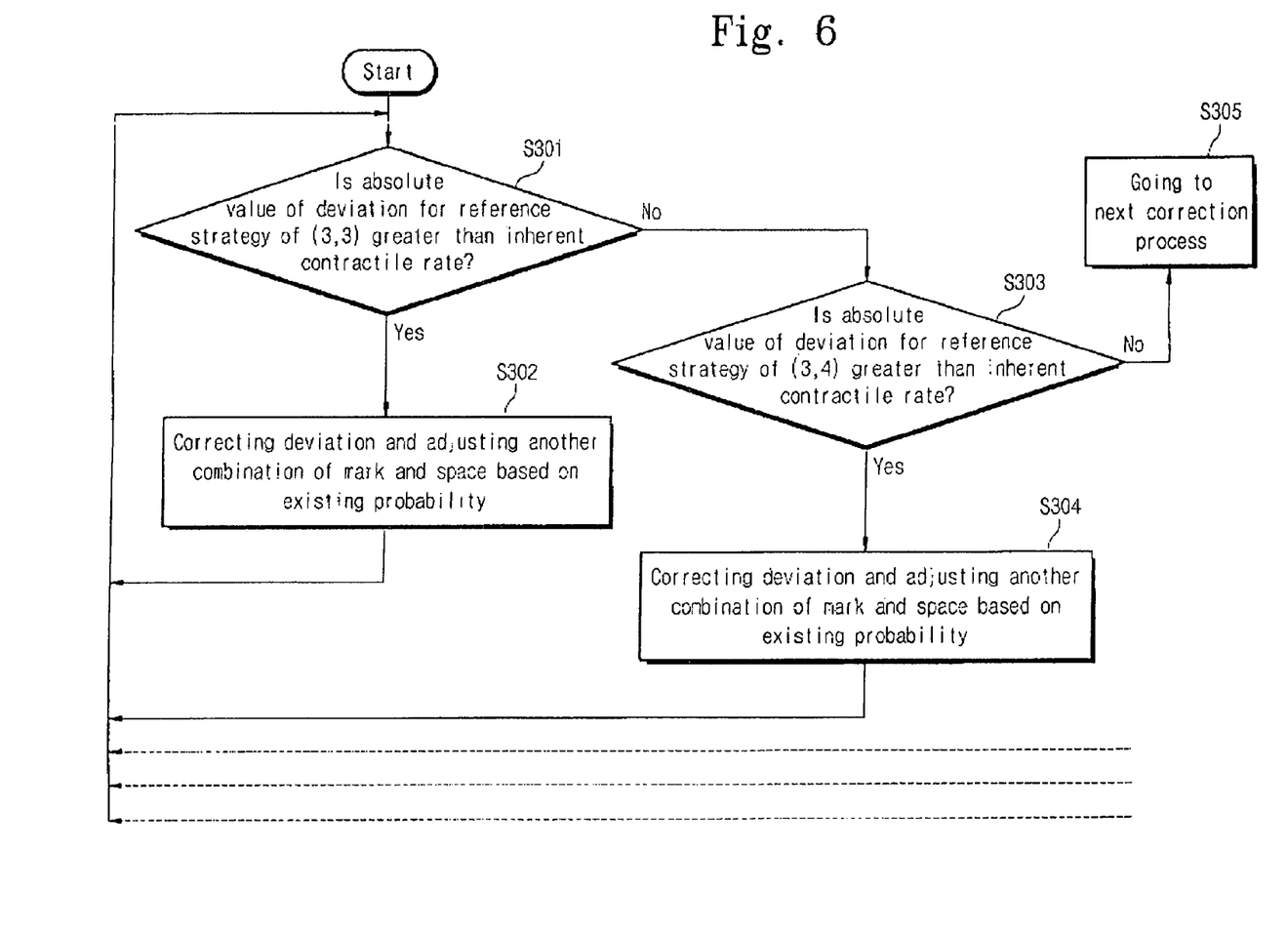
FIG. 6 is a flow chart for explaining a sequence that may be used to obtain an optimal write strategy according to an embodiment of the present invention.
Figure 7:
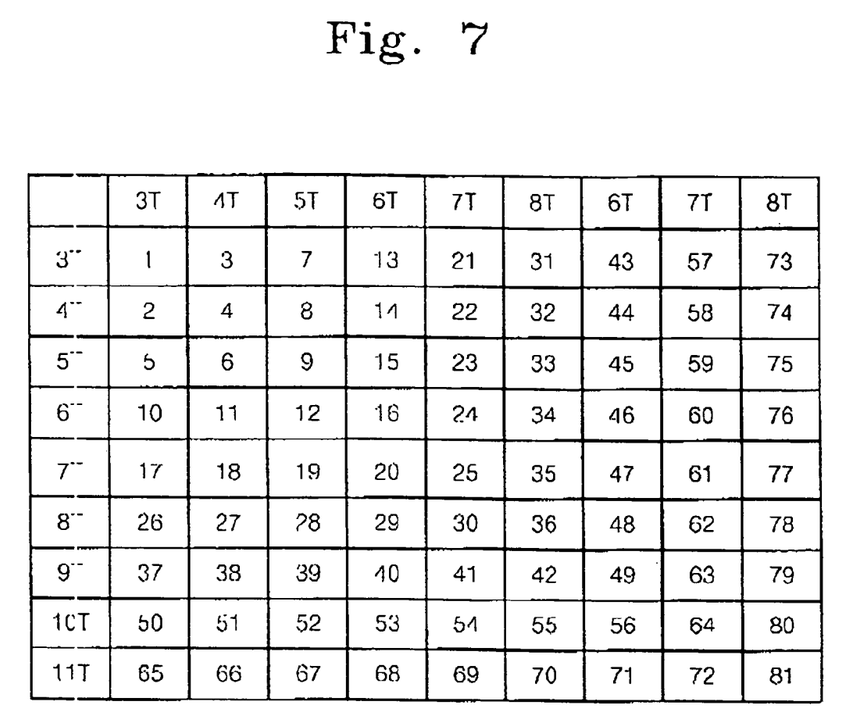
FIG. 7 is a table showing a correction sequence that may be used to obtain an optimal write strategy according to an embodiment of the present invention.

In S205, when the inherent contractile rate of each of the combinations of the marks and lands is obtained, a computation of a correction value like approaching the deviation to zero is performed, as shown in FIG. 6. The above computation procedure will be described with reference to FIGS. 6 and 7.

In the present embodiment, the method of computing the correction value sets the optimal write strategy by suppressing the strategy of when information is recorded in the reference write strategy using the inherent contractile rate corresponding to the minimum resolution described above, below the minimum resolution.

Also, addition of the correction value of each of the marks and lands is characterized in that such additions are processed in a sequence from the highest existing probability to the lowest existing probability. In other words, correcting the combination of the mark and land having the high existing probability (see the process sequence of FIG. 7) greatly influences a combination of other mark and land, so that each correction value is converged within a short time.

In concrete, as shown in FIG. 6, with respect to the combination of 3T mark and 3T land having the highest existing probability, it is determined whether an absolute value of the deviation for the reference strategy is greater or smaller than the inherent contractile rate (S301). When the absolute value of the deviation for the reference strategy is greater than the inherent contractile rate, the deviation is corrected and at the same time the deviation for another combination of mark and land is also corrected on the basis of the existing probability (S302).

Meanwhile, when the absolute value of the deviation for the reference strategy is smaller than the inherent contractile rate, a correction for the combination of the 3T mark and 3T land having the next highest existing probability is performed (S303). Also, the correction for the combination of the 3T mark and 4T land is performed equal to that for the combination of the 3T mark and 3T land (S303, S304), and then such a correction is performed with respect to the combination of the 14T mark and 14T land.

Figure 9:
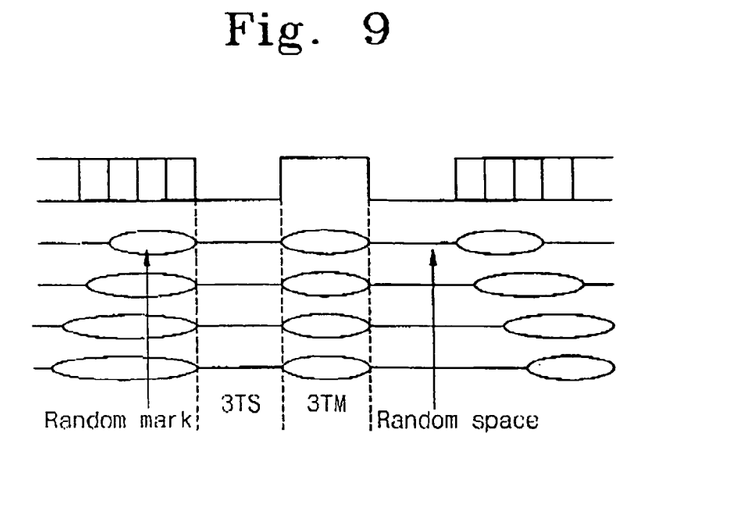
FIG. 9 is a schematic view illustrating an example of recorded pattern according to an embodiment of the present invention.

The aforementioned particular pattern performing information recording indicates a signal pattern that a particular land is positioned after a particular mark or a particular mark is positioned after a particular land, for example, 3T land (3TS) is essentially followed by 3T mark (3TM), as shown in FIG. 9. The waveform shown in FIG. 9 is only one example, and other signal pattern that the land length and the mark length are different than each other, for example, a signal pattern that 4T land is essentially followed by 6T mark, may be allowed. Also, such signal patterns can reduce arithmetic load when the combination of the mark and land is made having a higher existing probability.

By using such a particular pattern, considering the existing probability of those other than the mark and land having a high existing probability such as 3T, information is recorded using a signal pattern that a random signal having a low existing probability is disposed after the 3T land or 3T mark, by measuring the 3T mark after the random pattern, the same result as that of when measuring a deviation of the 3T mark after the 3T land is obtained. Accordingly, by using the particular pattern, an equal evaluation can be simply performed without needing a high analysis function. Also, the particular pattern may be a signal pattern, which allows the 3T mark to be essentially followed by the 3T land.

Figure 8A:
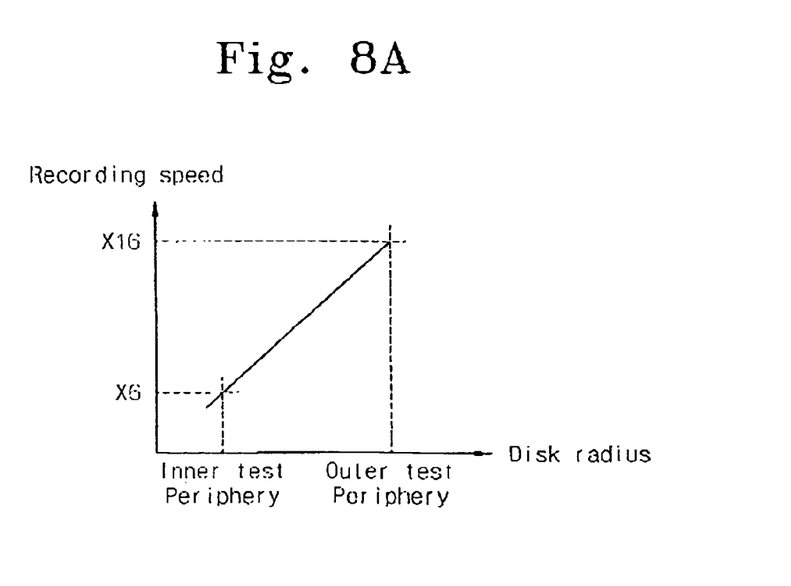
FIG. 8A is a graph showing the relationship between a radial position of an optical disk and a recording speed of the optical disc.
Figure 8B:
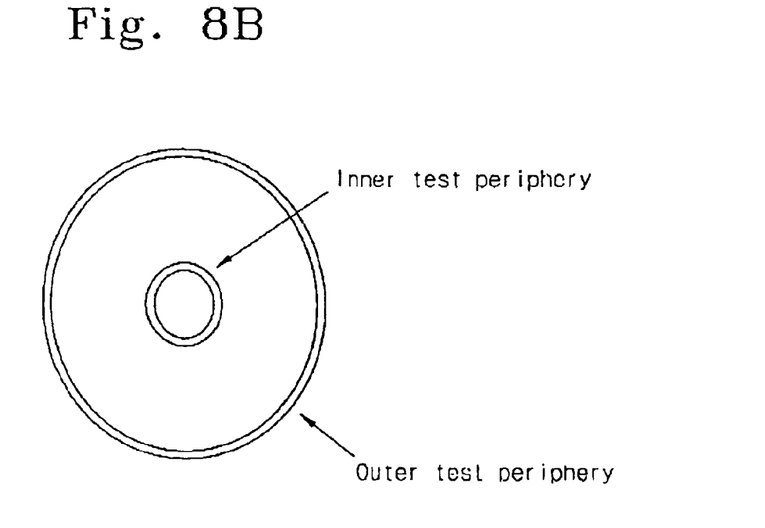
FIG. 8B is an example of a plane view of an optical disk.

In addition, to set the record area in the test area of the inner periphery or outer periphery of the optical disk is due to the below reasons. In other words, the optical disk has a limit revolution that is fixed by a mechanical factor. Meanwhile, in order to record information uniformly or in a high density, it is necessary to increase the record speed from the inner periphery of the disk to the outer periphery, as shown in FIG. 8.

However, since the record speed has a close relationship with the write strategy including the record power, when the information is recorded at a speed below 6 times, it is preferable to obtain the optimal write strategy from the test area of the outer periphery. To this end, the present invention sets the write strategy in the inner periphery or outer periphery of the optical disk.

Next, after the correction value is computed in S103, the record power is again corrected using the corrected write strategy (S104). In concrete, information is recorded at several different record powers after the correction, and the optimal record power is obtained from the reproduction β value, HF modulation value, jitter value, or the like.

Figure 10:
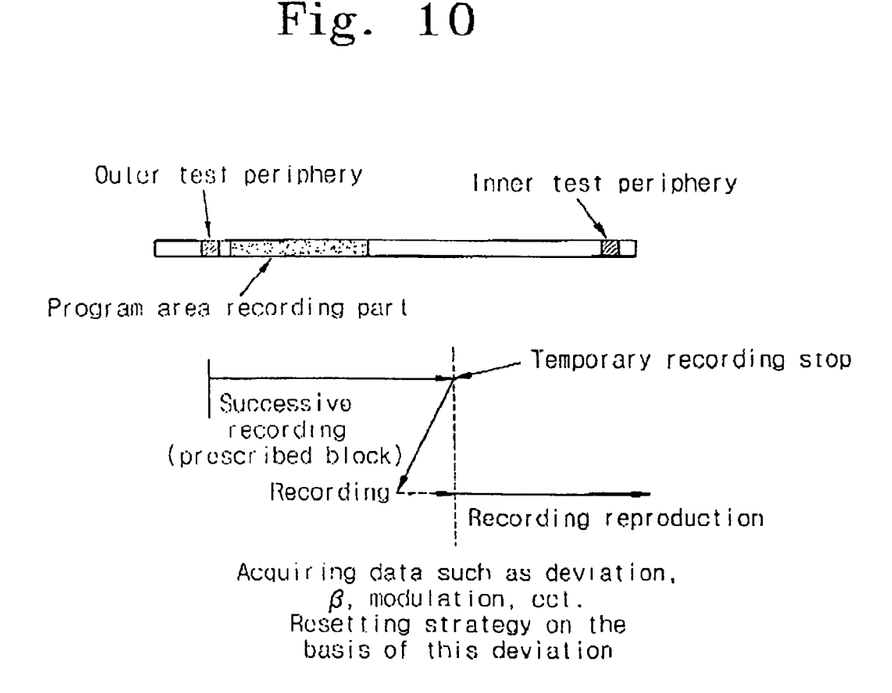
FIG. 10 is a schematic view for explaining an example of a consecutive information record operation according to an embodiment of the present invention.

Next, information is again recorded using the write strategy with the again corrected record power (S105). Also, as shown in FIG. 10, once the information recording is completed to a prescribed record block within the program area of the optical disk, the recording operation is stopped (S106). Once the recording operation is stopped, the recorded information is reproduced to compute a correction value whose deviation is within a predetermined range, according to the procedure of S103 (S107).

The above operation is performed because when successive information is recorded on an entire surface of the optical disk, wavelength of the semiconductor laser is varied due to an increase in inner temperature of the optical disk device and the like, or recording quality is varied due to non-uniform thickness of dye film or change of groove shape in the inner periphery and outer periphery of the optical disk.

In general, to cope with the above problem, the conventional optical disk device monitors a feedback light in the optical pickup 2 to correct the record power such that the waveform of the feedback light is equal to that of an initial state. However, the conventional method can correct only the influence of an inversion of the optical disk.

In the present invention, to correct the variation in wavelength due to temperature variation of the semiconductor laser or record sensitivity, once the information recording is completed to a recording block prescribed in the program area, the recording is stopped, and the recorded information is again reproduced to compute the correction value such that the deviation is within a predetermined range.

Also, in the operation of processing the deviations, there exists a limitation in setting a correction value of one time. This is because if a large correction is performed at one time, there may be caused a problem in the successiveness of data before and after the correction. Accordingly, in the operation of processing the deviations, the range of the correction value of one time is allowed to be limited such that an optimal range is set by several times processes, thereby suppressing the influence on the successiveness of data to the minimum to set an optimal write strategy.

Further, when setting the write strategy, β value or HF modulation value is measured and recording power is again corrected (S108). By doing so, the recording power is optimized to maintain the recording quality in a better state. Also, the final write strategy is stored in the memory along with the disk ID. Accordingly, in case where a further recording of information is later required in the same optical disk, the recording operation is performed using the strategy stored in the memory.

Meanwhile, in the case where the optical disks are the same in kind but different in lot number, they are not uniform in characteristics. In such a case, the deviation is obtained using the strategy stored in the memory as a reference strategy, and correction is performed so that a strategy corresponding to each of all the optical disks can be set. Moreover, in case of the optical disks, when information is recorded in more many disks, data is accumulated so much. Therefore, it can be expected that repeated usage enhances the recording quality, According to the present invention, it is possible to set an optimal write strategy within a short time period.

Also, it is possible to set an optimal write strategy including characteristics (e.g., wavelength or beam diameter of a laser diode, distortion of signals, etc.) of an optical disk device as well as characteristics of an optical disk within a short time period.

Further, since the optical disk device has a reevaluation function to set a better write strategy using an optimized write strategy as a reference write strategy with respect to an inherent optical disk, enhancement in recording quality can be expected when a specific optical disk is used for a specific optical disk device.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An optical memory device for recording and reproducing information by forming marks and lands in an optical information recording medium, the optical memory device comprising:

write strategy setting part which measures a deviation in information recorded in a test area within the optical information recording medium and which sets a write strategy according to the deviation;

write strategy determining part for recording information in the test area using the write strategy set by the write strategy setting part, evaluating deviations in the recorded information, and repeatedly executing a processing performed by the write strategy setting part to determine an optimal write strategy such that the deviation is within a predetermined range; and write strategy storing part for storing the determined write strategy by the write strategy determining part, wherein the write strategy determining part comprises:

measuring part for measuring lengths of the marks and lands recorded in the optical recording medium;

measuring value memorizing part for memorizing a result of the measuring part;

theory length memorizing part for memorizing theoretical lengths of the marks and lands;

deviation value computing part for computing deviation values of the marks and lands by changing the write strategy on the basis of the lengths of the marks and lands memorized in the measuring value memorizing part and the lengths of the mark and land memorized in the theory length memorizing part;

contractile rate computing part for computing inherent contractile rates of all marks and lands from the computed deviation value and an existing probability of each of the marks and lands; and write strategy correcting part for computing a correction value for a reference write strategy on the basis of the inherent contractile rate of and the existing probability of all the marks and lands such that the deviation values of all the marks and lands are within the predetermined range, and correcting the write strategy on the basis of the correction value.

2. The optical disk device of claim 1, wherein the recorded information is memorized such that a particular land is followed by a particular mark or a particular mark is followed by a particular land.

3. The optical disk device of claim 1, wherein the recorded information is memorized such that a particular land is followed by a particular mark or a particular mark is followed by a particular land.

4. The optical disk device of claim 1, further comprising write strategy updating part for recording information in a program area of the optical information recording medium using the write strategy memorized in the write strategy memorizing part, concurrently recording a predetermined block and temporarily stopping the recording of the information, reevaluating the deviation measured by the write strategy setting part, repeatedly executing a processing carried out by the write strategy setting part such that the deviation is within a predetermined range, and updating an optimal write strategy.

5. The optical disk device of claim 4, wherein a maximal update amount of one time is in advance determined by the write strategy updating part.

6. The optical disk device of claim 4, wherein when again executing the setting of the write strategy, the write strategy update part requires a $\beta$ value or HF modulation value and at the same time setting a recording power such that the required $\beta$ value or HF modulation value becomes a target value determined in advance.

7. The optical disk device of claim 1, further comprising a data table memorizing the write strategy determined by the write strategy determining part in relation to ID information of the optical information recording medium, wherein the write strategy setting part measures the deviation of the recorded information using the write strategy memorized in the data table with respect to the optical information recording medium memorized in the data table.

* * * * *